United States Patent
Chiloyan

(10) Patent No.: US 7,043,664 B1
(45) Date of Patent: May 9, 2006

(54) FIRMWARE RECOVERY

(75) Inventor: John Herbert Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 10/285,823

(22) Filed: Oct. 31, 2002

(51) Int. Cl.
G06F 11/00 (2006.01)

(52) U.S. Cl. ......................................................... 714/5

(58) Field of Classification Search .................... 714/5, 714/7, 8, 13, 15, 27, 43, 47, 48; 717/126, 717/127; 710/8–10
See application file for complete search history.

(56) References Cited

U.S. PATENT DOCUMENTS

| | | | |
|---|---|---|---|
| 5,918,048 A | 6/1999 | Mealey et al. ............... | 395/652 |
| 6,219,828 B1 | 4/2001 | Lee ............................. | 717/4 |
| 6,314,532 B1 * | 11/2001 | Daudelin et al. ........... | 714/38 |
| 6,341,373 B1 * | 1/2002 | Shaw .......................... | 717/173 |
| 6,357,021 B1 * | 3/2002 | Kitagawa et al. ........... | 714/41 |
| 6,381,741 B1 * | 4/2002 | Shaw .......................... | 717/168 |
| 6,446,199 B1 * | 9/2002 | Howe et al. ................. | 713/1 |
| 6,708,231 B1 * | 3/2004 | Kitagawa .................... | 710/10 |
| 2002/0026634 A1 * | 2/2002 | Shaw .......................... | 717/173 |
| 2003/0028766 A1 * | 2/2003 | Gass et al. .................. | 713/164 |
| 2003/0066062 A1 * | 4/2003 | Brannock et al. ........... | 717/169 |

OTHER PUBLICATIONS

Determining Firmware Revisions for SSA/A3000/A5X00/RSM2000 Related Devices. nd. 3pp. Available http://sunsolve.sun.com/pub-cgi/retrieve.pl?doc=finfodoc/20107.
Cisco Systems. Catalyst 1900 Series Installation and Configuration Guide. nd. 5pp. Available http://www.cisco.com/univercd/cc/td/doc/product/lan/28201900/1928v8x/19icg8x/index.htm.

* cited by examiner

*Primary Examiner*—Nadeem Iqbal
(74) *Attorney, Agent, or Firm*—Ronald M. Anderson

(57) ABSTRACT

A method and system for automatically detecting invalid or superseded firmware and replacing at least a portion of the firmware stored in rewritable, nonvolatile memory of an electronic device. Boot code of the device firmware checks whether any portion of the device firmware is corrupt or superseded by a later version. The boot code stores a status indication of the firmware, and communicates the status to a host device over a bus or network. If the firmware is corrupt or superseded, the host accesses a replacement firmware that is stored on a local or remote storage. The replacement firmware may comprise the entire firmware or a portion of the firmware. The host then communicates at least a portion of the replacement firmware to the electronic device. Upon receipt, the electronic device overwrites at least a portion of the existing firmware with the replacement firmware in the rewritable, nonvolatile memory.

17 Claims, 5 Drawing Sheets

FIRMWARE RECOVERY

FIELD OF THE INVENTION

The present invention generally relates to a method and system that automatically replaces data stored in nonvolatile memory of electronic devices, and more specifically, pertains to detecting corrupt or superseded data in the nonvolatile memory of such a device, and providing an indication to a host electronic device, so that the host electronic device then provides replacement data for the electronic device to overwrite into the nonvolatile memory.

BACKGROUND OF THE INVENTION

Many consumer electronic devices contain embedded software that is stored in nonvolatile memory and commonly referred to as firmware. Devices such as digital cameras, printers, scanners, personal digital assistants (PDAs), programmable remote controls, and wireless access points are just a few examples of products that may contain firmware. Firmware provides machine instructions to a microprocessor, microcontroller, an application specific integrated circuit (ASIC) with an embedded processor, or to another microprocessor based system to perform a desired function. In many devices, firmware is stored in rewritable, nonvolatile memory. Although some types of electronic memory, such as traditional read only memory (ROM) can only be written to once, flash memory and electrically erasable programmable read only memory (EEPROM) can be overwritten with new instructions. A nonvolatile memory device is a type of electronic memory whose contents are preserved, even though electrical power is not applied to the device. In many products, it is desirable to provide rewritable, nonvolatile memory to support applications that require custom settings for each product, such as a unique serial number, radio frequency configuration settings, or other settings that are specific to each unit of the product. In other cases, it may be desirable to update a product with new firmware to fix bugs or add new features and functions to the product as further development occurs.

Firmware stored in rewritable, nonvolatile memory often includes machine instructions for fundamental initialization and operation of the device. Such instructions are referred to as "bootstrap code," or simply "boot code." When initially applying power to a device or resetting a device, boot code read by the processor from the re-writable, nonvolatile memory instructs the processor to execute start up functions, such as performing a power-on-self-test (POST), initializing basic input/output (BIOS) functions, loading the contents of post-boot code into random access memory (RAM) for faster program execution, and passing control to the post-boot code. The boot code may also contain instructions necessary to communicate with a host device over a bus. Because the boot code is typically critical to the fundamental initialization and operation of a device, conventional users may not be permitted to modify the boot code. In most cases, the boot code remains fixed, or is upgraded only by an authorized technician. However, some devices also enable a general user to update the post-boot code to fix bugs or add new functions and features.

For example, a user may be notified by a device manufacturer of a firmware update that is available for download through the Internet. The user may then download the updated firmware to the user's host computer with a conventional browser. The downloaded files or the device may include a utility to transfer the updated firmware to the device and instruct the device to overwrite the old firmware with the updated firmware. This process is often very automated, so that the user does not need special knowledge or skills to accomplish the firmware update. Sometimes, however, through lack of patience or knowledge, the user may accidentally disrupt the transfer of the updated firmware to the device, which can leave the update partially complete, so that the device is no longer fully operational. In addition, this problem can arise if during the update, power is lost, an electrostatic discharge (ESD) occurs that modifies the contents of the memory, or if some other cause interrupts the update while the re-writable, nonvolatile memory is being overwritten. Regardless of the cause, an interruption can cause the device to have incomplete or corrupt firmware, rendering the device useless. Even if the boot code is not corrupt, the post-boot code may be incomplete or corrupt to a degree that the device is substantially unusable. And, to reduce memory costs, most devices do not include a backup copy of the firmware. The only recourse may be to send the device back to the manufacturer to have the firmware reinstalled by a technician.

The typical user does not have the knowledge or skill to detect that a problem exists with firmware, or to fix the firmware, even if a problem is detected. The user may incorrectly suspect a problem with a device driver that is running on the host computer, incorrectly suspect a communication problem with the Internet or with the device, or incorrectly suspect a different hardware or software problem. In some cases, it may be relatively simple to overwrite the corrupt firmware with valid firmware. However, it is difficult for a general user to diagnose that only a simple overwrite is needed, and often difficult for an unskilled user to perform such an overwrite manually. Instead, the user typically must pay a technician to diagnose and fix the device, or simply discard the device and buy a new one. In any case, the user will be displeased with the device manufacturer for the inconvenience and expense, even if it was the user's error or an unexpected event that caused the problem. Thus, it would be desirable to provide automatic means to detect and repair firmware of a device if the firmware should become damaged, or is superseded, whether during an update or otherwise.

SUMMARY OF THE INVENTION

The present invention provides a method and system for automatically detecting invalid or superseded firmware and replacing at least a portion of the firmware stored in rewritable, nonvolatile memory of an electronic device. The electronic device may be a peripheral device, a peer device, a network device, a portable consumer device, or any other electronic device that includes a rewritable, nonvolatile memory. The electronic device also needs a processor or circuit for detecting the status of the firmware. A process is added to the boot code of the device firmware to check whether any portion of the device firmware is corrupt or superseded by a later version. The process preferably performs a check function on the existing firmware and compares the function result with an expected value. Based on the comparison, the boot code stores a status indication of the firmware. When the electronic device is coupled to a host device, the electronic device reports the status of the firmware to the host. Communication between the electronic device and the host device may occur in any fashion, such as over a bus, network, or wireless communication channel. If the firmware is corrupt or superseded, the host accesses a replacement firmware that is stored on a local or remote storage. The replacement firmware may comprise the entire firmware or a portion of the firmware. The host then communicates at least a portion of the replacement firmware to the electronic device. Upon receipt, the electronic device overwrites at least a portion of the existing firmware with the replacement firmware in the rewritable, nonvolatile memory.

Another aspect of the invention is a memory medium having machine instructions comprising the boot code for performing the status check, communicating with the host, and overwriting the firmware. Similarly, a further aspect of the invention is a memory medium having machine instructions for the host to obtain the firmware status from the electronic device, obtain replacement firmware, and communicate the replacement firmware to the electronic device for overwriting, as described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
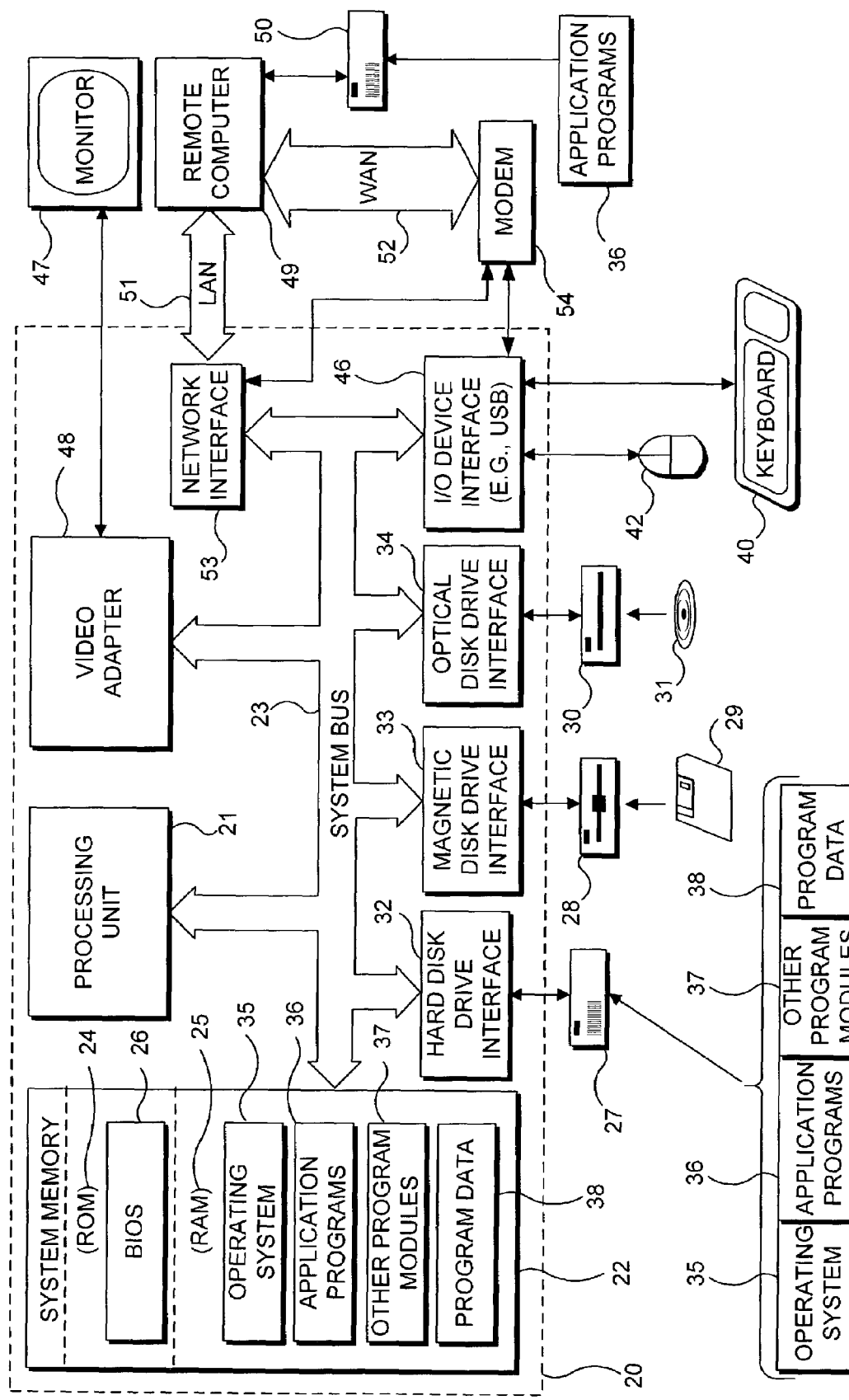
FIG. 1 is a schematic block diagram of an exemplary host personal computer (PC) system suitable for implementing the present invention.

FIG. 1 and the following discussion are intended to provide a brief, general description of a suitable host computing environment for use in implementing the present invention. Although not required, a portion of the present invention will be described in the general context of computer executable instructions, such as program modules that are executed by a personal computer. Generally, program modules include routines, programs, objects, components, data structures, etc. that perform particular tasks or implement particular abstract data types. Moreover, those skilled in the art will appreciate that this invention may be practiced with other computer system configurations, including peripheral devices, hand held devices, pocket personal computing devices, digital cell phones adapted to connect to a network, and other microprocessor-based or programmable consumer electronic devices, game consoles, TV set-top boxes, multiprocessor systems, network personal computers, minicomputers, mainframe computers, industrial control equipment, automotive equipment, aerospace equipment, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer 20, sometimes referred to as a host computer. Personal computer 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the personal computer 20, such as during start up, is stored in ROM 24.

The personal computer 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for personal computer 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35 (optionally including one or more device drivers), one or more application programs 36 (such as a setup program), other program modules 37, and program data 38.

A user may enter commands and information into personal computer 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a PS/2 port, and/or a USB port. For exemplary purposes, I/O device interface 46 will be discussed below primarily as a USB port. Similarly, a monitor 47 or other type of display device is also connected to system bus 23 via an appropriate interface, such as a video adapter 48, and is usable to display Web pages, and/or other information. In addition to the monitor, personal computers are often coupled to other peripheral output devices (not shown), such as speakers (through a sound card or other audio interface—not shown).

Personal computer 20 may operate in a networked environment using logical connections to one or more remote sources, such as a remote computer 49. Remote computer 49 may be another personal computer, a server (which is typically generally configured much like personal computer 20), a router, a network personal computer, a peer device, a satellite, or other common network node, and typically includes many or all of the elements described above in connection with personal computer 20, although only an external memory storage device 50 has been illustrated in FIG. 1. In a networked environment, program modules depicted relative to personal computer 20, or portions thereof, may be stored in the remote external memory storage device. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, personal computer 20 is connected to LAN 51 through a network interface or adapter 53. When used in a WAN networking environment, personal computer 20 typically includes a modem 54 or other means for establishing communications over WAN 52, such as the Internet. Modem 54, which may be internal or external, is typically coupled directly to the system bus via an internal slot, coupled to the bus via I/O device interface 46, or coupled to the bus via network interface 53. For exemplary purposes, modem 54 will be discussed below primarily as a broadband modem, such as an ADSL modem, that is coupled to the system bus via a USB interface. It will be appreciated that the network connections shown are exemplary and other means of establishing a communications link between the computers may be used, such as wireless communication and wide band network links.

Exemplary Implementation of the Present Invention

The following describes exemplary implementations of preferred embodiments using I/O device interface 46 for communication between personal computer 20, acting as a host device, and a peripheral device, such as an ADSL modem 54a (which is discussed below in connection with FIG. 2). The present invention is particularly useful in connection with peripheral devices that meet the USB specification, but can alternatively be used with devices that couple to a host through other types of communication. Those skilled in the art will recognize that the details provided below may be modified slightly to apply to other forms of communication with peripheral devices, such as Ethernet (communicating directly with the host device, as well as communicating over either a LAN or WAN), via RS-232C serial, Institute of Electrical and Electronic Engineers (IEEE) 1284 parallel, IrDA infrared, IEEE 1394 ("Firewire"), a wireless radio communication, or via other standards. Accordingly, it will be understood that the present invention is applicable to almost any type of device that communicates with another device using almost any type of communication protocol. However, peripheral devices that are designed to connect to a computing device through a USB port are used consistently in the following examples to simplify the discussion and disclosure of this invention and because an initial preferred embodiment has been developed that uses the USB port.

Figure 2:
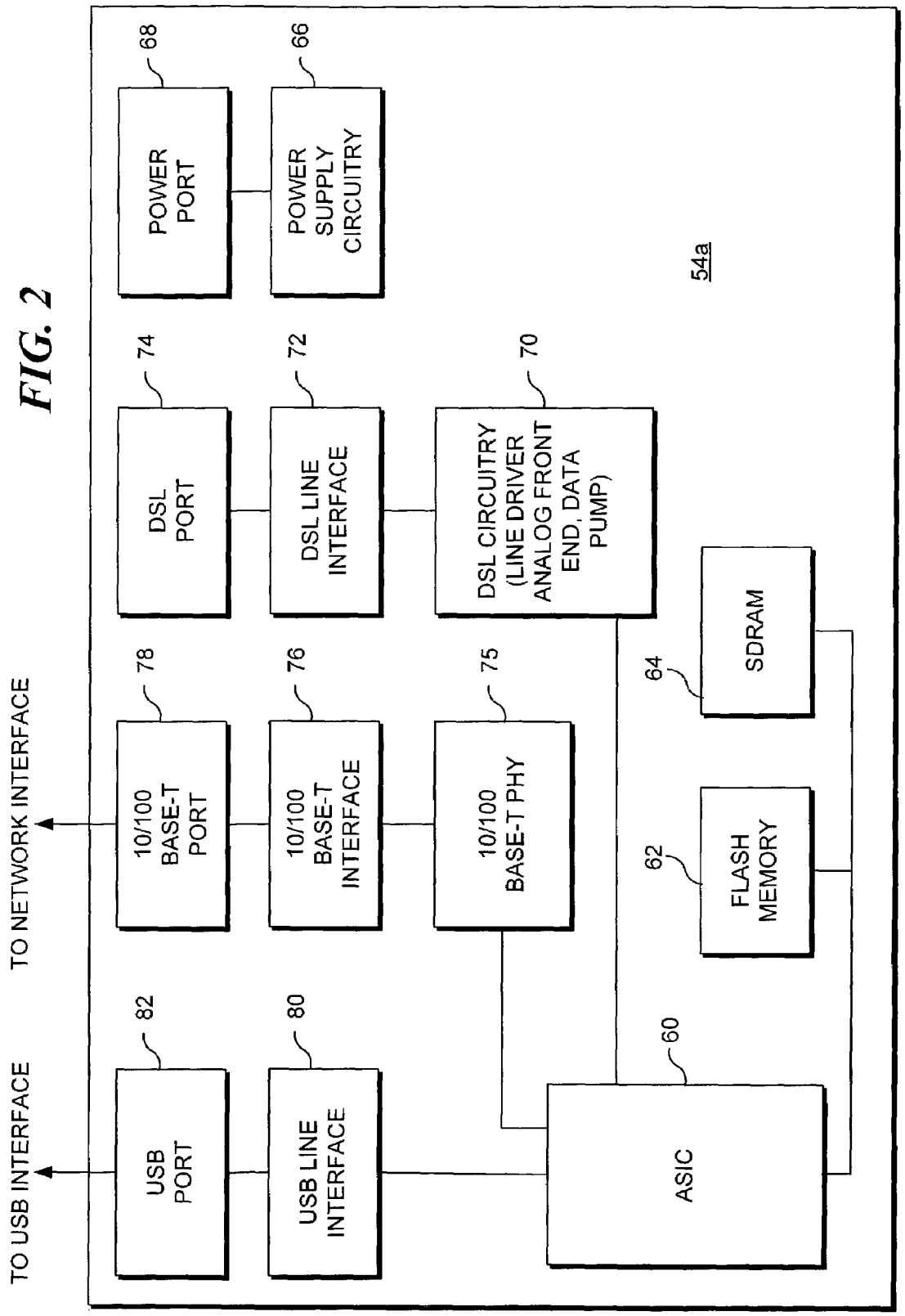
FIG. 2 is a block diagram of an asynchronous digital subscriber line (ADSL) modem that includes a rewritable nonvolatile (flash) memory.

FIG. 2 is a block diagram of an exemplary ADSL modem 54a. ADSL modem 54a includes an ASIC 60, which preferably includes a reduced instruction set computing (RISC) processor conforming to ARM™ version 7 design specifications developed by ARM, Ltd. ASIC 60 is in communication with a rewritable, nonvolatile flash memory 62. Flash memory 62 stores boot code and post-boot code. It must be emphasized that the present invention is usable with other types of rewritable, nonvolatile memory and is not limited to flash memory. ASIC 60 is also in communication with a synchronous dynamic random access memory (SDRAM) 64, which may temporarily store a copy of the post-boot code and store active data while ADSL modem 54a is operating. ASIC 60 and other digital components within ADSL modem 54a use direct current (DC) power that is produced by power supply circuitry 66, which is energized with alternating current (AC) power from a line source, input through a power port 68.

ASIC 60 is further in communication with DSL circuitry 70, which is primarily a line driver, analog front end and data pump. DSL circuitry 70 supports DSL communication between ASIC 60 and a DSL line interface 72. DSL line interface 72 provides a hardware interface for DSL communication over the WAN that is connected through DSL port 74. The status of power, DSL communication, WAN communication, and other aspects of ADSL modem 54a are indicated by light emitting diodes (LEDs) (not shown).

Communication received over the WAN is routed to the host computer by ASIC 60 via the LAN or direct communication through a USB port 82. To facilitate LAN communication, ASIC 60 communicates with a 10/100 Base-T physical layer device (PHY) 75. PHY 75 communicates over the LAN via a 10/100 Base-T interface 76 and a 10/100 Base-T port 78. 10/100 Base-T port 78 couples to network interface 53 (shown in FIG. 1). Preferably, however, ADSL modem 54a communicates with the host computer via a direct USB connection. Specifically, ASIC 60 communicates with a USB line interface 80 and USB port 82, which is coupled to I/O device interface 46 (shown in FIG. 1).

Figure 3A:
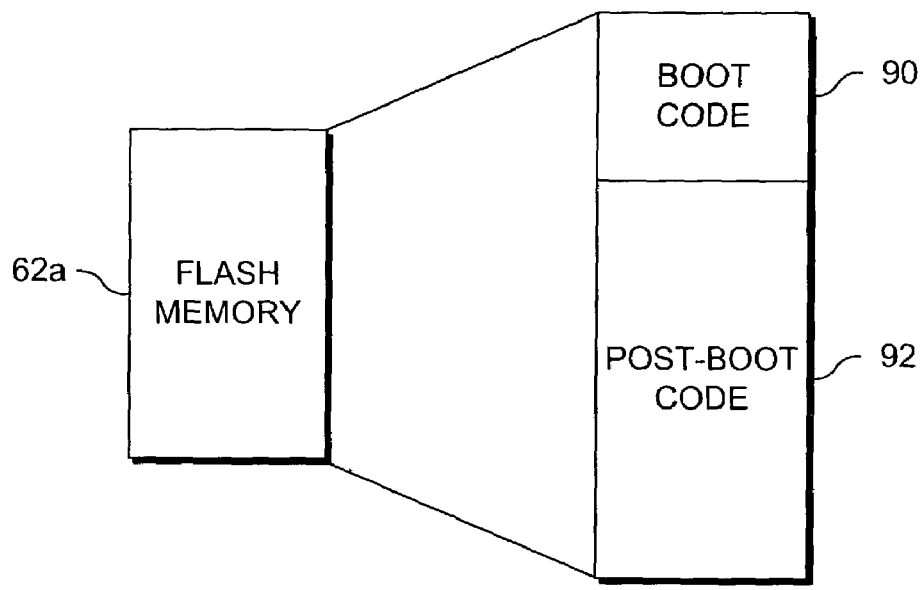
FIG. 3A is a block diagram illustrating one logical structure of a rewritable nonvolatile (flash) memory used in a device such as the ADSL modem of FIG. 2.
Figure 3B:
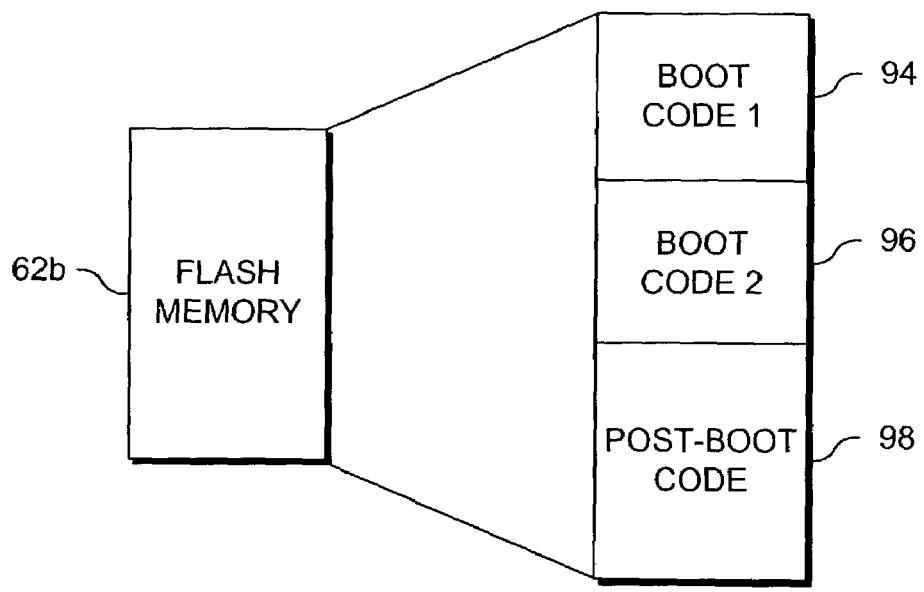
FIG. 3B is a block diagram illustrating a slightly more complex logical structure for the rewritable nonvolatile (flash) memory.

As indicated above, ADSL modem 54a operates according to instructions stored in flash memory 62. FIG. 3A is a block diagram illustrating one logical structure of a flash memory 62a. This simple structure comprises a boot code 90 for initializing the ADSL modem and instructing the ASIC to load and execute a post-boot code 92. A slightly more complex logical structure is illustrated in FIG. 3B for a flash memory 62b, which includes a first boot code 94 and a backup copy or maintenance version as a second boot code 96. A corresponding post-boot code 98 provides machine instructions to the ASIC for normal operation of the ADSL modem. Preferably, any boot code is written only once during manufacturing and is never written again. However, those skilled in the art will recognize that the boot code may also be overwritten if desired. Post-boot code is also written during manufacturing, but may be automatically updated via a network or USB interface, if corrupt or outdated by a newer version.

Figure 4:
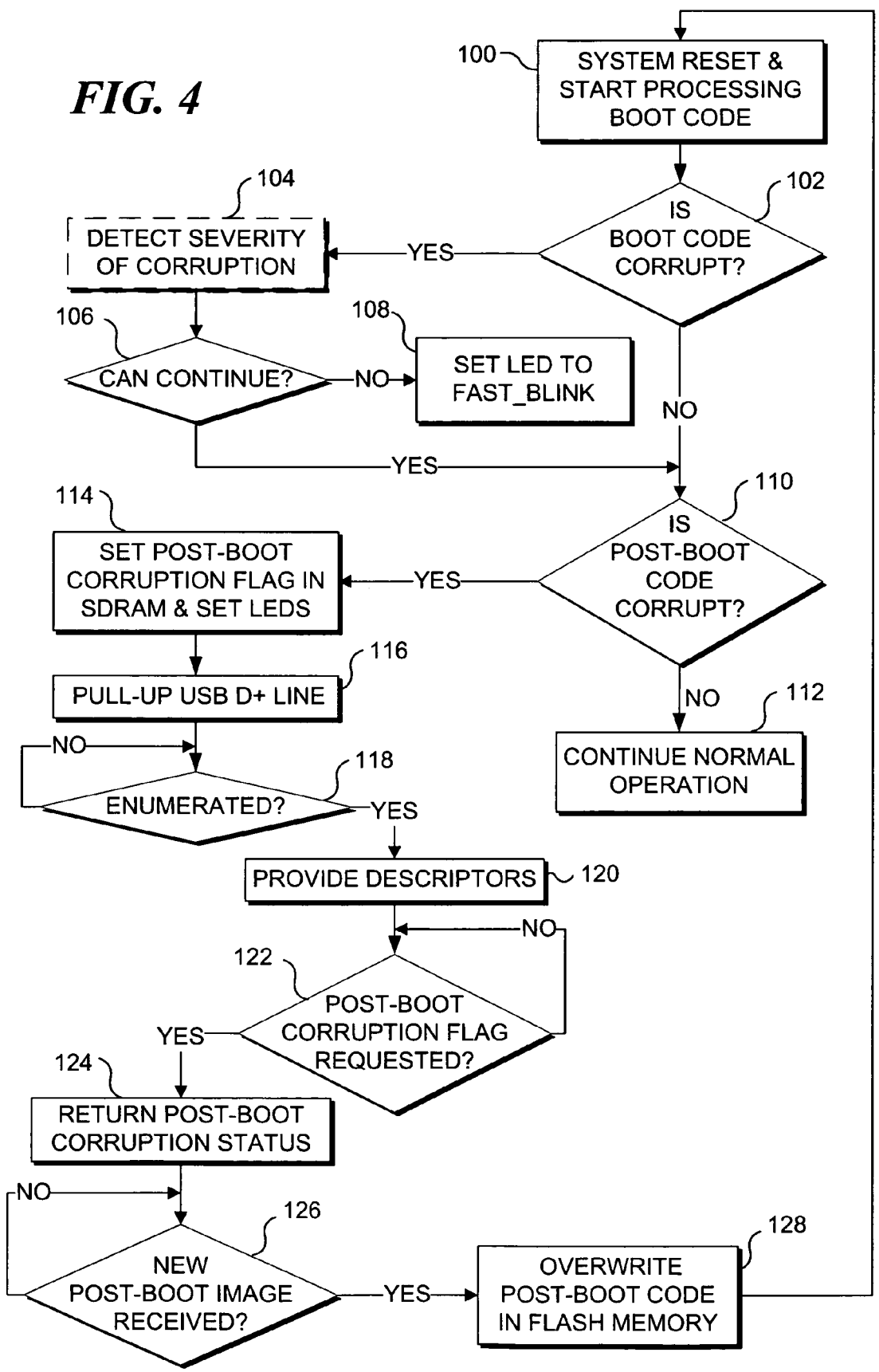
FIG. 4 is a flow diagram illustrating the logical steps implemented by the boot code when the ADSL modem of FIG. 2 (or other device) is powered on or reset.

FIG. 4 is a flow diagram illustrating the logical steps implemented by the boot code when the ADSL modem is powered on or reset. At a step 100, the ASIC initiates system reset or power up processing by reading the boot code from the flash memory and executing the initial boot code instructions. For example, the boot code may instruct the ASIC to perform a power on self test and initialize the DSL, Ethernet, and USB interfaces. The boot code also initializes the ADSL modem for communication with a host computer by identifying the ADSL modem to the host computer via the USB connection.

At a decision step 102, the boot code instructs the ASIC to perform a checksum, cyclical redundancy check (CRC), or other validity test of the boot code itself. If the ASIC determines that the boot code is corrupt, the boot code may optionally instruct the ASIC to detect the severity of the corruption, at a step 104. At a decision step 106, the boot code may further instruct the ASIC to determine whether the corruption is so severe that the boot up process cannot proceed. If the boot up process cannot continue, the ASIC sets a flag that energizes a designated LED, at a step 108, to indicate that a corruption in the boot code has occurred. For example, the designated LED may be set to rapidly blink, or may simply be energized.

If the boot code is not corrupt, or if the boot up process may continue despite the corruption, the boot code instructs the ASIC to determine, at a decision step 110, whether the post-boot code is corrupt. As above, the ASIC may perform a checksum, CRC, or other validity test to determine whether the post-boot code is corrupt. If the post-boot code is not corrupt, the ADSL modem may continue with normal operation at a step 112. However, if the post-boot code is corrupt, the boot code instructs the ASIC to set a post-boot corruption flag in the SDRAM and to set one or more designated LEDs, at a step 114, to indicate corruption of the post-boot code. At a step 116, the ASIC also sets a high signal on a USB D+ line. The high signal on the D+ line simply notifies the host computer that a full-speed device is attached to the bus.

At a decision step 118, the ADSL modem waits to be enumerated by the host computer. Once the host computer enumerates the ADSL modem, the ADSL modem provides standard USB descriptors to the host computer at a step 120. Standard USB descriptors include a vendor identifier (VID), a product ID, a serial number, a firmware revision level, and/or other information related to the ADSL modem. At a decision step 122, the ADSL modem waits for additional instructions from the host computer. Specifically, the ADSL modem waits for a request from the host computer for a status of the post-boot corruption flag. Once the request is received, the ADSL modem checks the flag in the SDRAM and returns the post-boot corruption status to the host computer at a step 124. Those skilled in the art will recognize that ADSL modem may provide the post-boot corruption status during enumeration. Alternatively, the ADSL modem may broadcast the post-boot corruption status to the host computer, or otherwise send an unsolicited notification of the firmware status to the host computer. Similarly, the ADSL modem by send an unsolicited request for a firmware update to the host computer.

In any case, the ADSL modem then waits for the host computer to provide a new binary image of the post-boot code at a decision step 126. Those skilled in the art will recognize that the ADSL modem may receive a new binary image as a result of the above process detecting a corruption, or as a result of an intentional upgrade to the post-boot code and/or the boot code. The intentional upgrade may be initiated manually by the user or as a result of an automatic detection of an expired firmware version from an enumerated descriptor received from the ADSL modem. Once a new binary image of the post-boot code is received, the boot code instructs the ASIC to overwrite the existing post-boot code in the flash memory with the new binary image of the post-boot code at a step 128. The boot code then instructs the ASIC to reset the entire ADSL modem such that processing begins again at step 100. With the new binary image of the post-boot code written into flash memory, the boot process will flow down to step 112, setting the ADSL modem to its normal operation mode.

Figure 5:
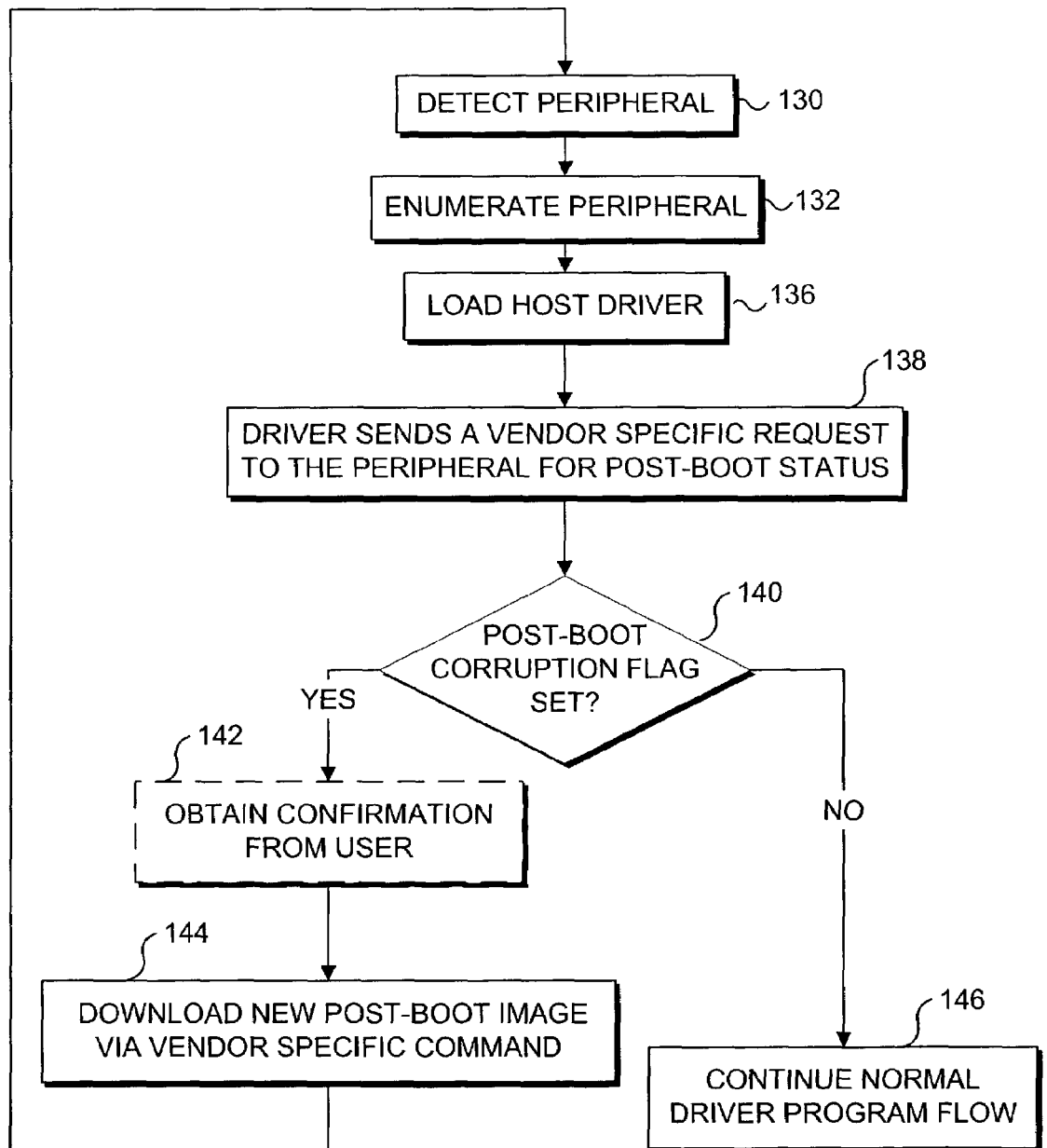
FIG. 5 is a flow diagram illustrating the logical steps performed by the host computer to restore a post-boot code to the memory in the ADSL modem or other device that includes a rewritable nonvolatile memory that may become corrupt.

FIG. 5 is a flow diagram illustrating logic performed by the host computer to provide updated post-boot code to the ADSL modem. At a step 130, the host computer detects the ADSL modem by the high signal on the D+line. The host computer then enumerates the ADSL modem for standard USB descriptors at a step 132. Those skilled in the art will recognize that enumeration refers to reading the descriptors and enabling the device. Preferably, the Ethernet interface is disabled during enumeration. Once the descriptors are received from the ADSL modem, the host computer uses the descriptors to identify the ADSL modem and its capabilities, and to load the appropriate driver for the ADSL modem, at a step 136.

At a step 138, the driver sends a vendor specific request to the ADSL modem for the status of the post-boot code. Upon receiving a vendor specific packet with the status of the post-boot code, the driver determines, at a decision step 140, whether the post-boot corruption flag is set. If the post-boot corruption flag is set, the driver obtains the new binary image of the post-boot code from a storage location in the host computer, or via network communication with a remote storage location, e.g., over the Internet or over a LAN. The driver may optionally request confirmation from the user, at a step 142, to proceed with sending the new binary image of the post-boot code to the ADSL modem for overwriting the existing post-boot code. This confirmation is also preferably used when the user is intentionally downloading an updated version of the post-boot code. The driver then downloads the new binary image of the post-boot code to the ADSL modem, at a step 144. Preferably, the driver employs another vendor specific request as a command to the boot code of the ADSL modem to overwrite the existing post-boot code with the new binary image of the post-boot code.

As indicated above, those skilled in the art will recognize that the driver may alternatively download a new binary image as a result of an intentional upgrade to the post-boot code and/or to the boot code. The intentional upgrade may occur in response to the user manually initiating the upgrade or by automatic detection of an expired firmware version from an enumerated descriptor. After the download of the firmware is completed, the ADSL modem will reset, and the host computer will redetect activation of the ADSL modem at step 130. The host computer will then follow the same logic as described above to verify that the ADSL modem is operating correctly. When the post-boot code is no longer corrupt (or after a desired upgrade to the firmware), normal operation of the driver continues at a step 146.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method of automatically replacing at least a portion of firmware stored in a rewritable, nonvolatile memory of an electronic device, comprising the steps of:

(a) executing machine instructions comprising a boot code included in the firmware in the electronic device to determine whether the firmware should be replaced because it is one of:
  (i) invalid;
  (ii) corrupt; and
  (iii) superseded by a newer version;
(b) indicating to a host device that at least a portion of the firmware needs to be replaced;
(c) receiving replacement firmware from the host device to replace the portion of the firmware that is in need of replacement, wherein said portion of the firmware comprises machine instructions that form a post-boot code that is separate from the boot code; and
(d) overwriting at least the portion of the firmware in the rewritable, nonvolatile memory of the electronic device that is in need of replacement, with the replacement firmware.

2. The method of claim 1, wherein the step of determining whether the firmware is in need of replacement comprises the step of processing the firmware with a specific algorithm and comparing the result with an expected value, at least a portion of the firmware being in need of replacement if the result does not equal the expected value.

3. The method of claim 1, wherein the step of indicating to a host device comprises the steps of:
  (a) receiving a request from the host device for a status of the firmware;
  (b) accessing a storage location in the electronic device that stores a status of the firmware; and
  (c) communicating the status of the firmware from the storage location to the host device.

4. The method of claim 1, further comprising the step of establishing communication between the electronic device and the host device over one of a universal serial bus, a serial bus, a parallel bus, a local area network, a wide area network, an Institute of Electrical & Electronics Engineers (IEEE) 1394 connection, and a wireless communication channel.

5. The method of claim 1, wherein the electronic device comprises one of a peripheral device, a peer device, a network device, and a portable consumer device.

6. A memory medium having machine instructions comprising a boot code stored thereon for carrying out the steps of claim 1.

7. A system for automatically replacing at least a portion of a firmware in an electronic device that is adapted to communicate with a host device, comprising:
  (a) a communication interface adapted to couple the electronic device in communication with a host device;
  (b) a processor; and
  (c) a rewritable, nonvolatile memory in communication with the processor and storing machine instructions comprising the firmware, said machine instructions causing the processor to carry out a plurality of functions, including:
    (i) executing machine instructions that comprise a boot code of the firmware to determine whether the firmware should be replaced because it is one of:
      (1) invalid;
      (2) corrupt; and
      (3) superseded by a newer version;
    (ii) determining that at least a portion of the firmware is in need of replacement;
    (iii) indicating to a host device that at least a portion of the firmware is in need of replacement;
    (iv) receiving replacement firmware from the host device through the communication interface, to replace the portion of the firmware that is in need of replacement, wherein said portion of the firmware comprises machine instructions that form a post-boot code that is separate from the boot code; and
      (v) overwriting at least the portion of the firmware that is in need of replacement in the rewritable, nonvolatile memory of the electronic device, with the replacement firmware.

8. The system of claim 7, wherein the machine instructions further cause the processor to carry out the functions of:
  (a) receiving a request from the host device for a status of the firmware;
  (b) accessing a storage location in the electronic device that stores a status of the firmware; and
  (c) communicating the status of the firmware from the storage location to the host device.

9. The system of claim 7, wherein the electronic device comprises one of a peripheral device, a peer device, a network device, and a consumer device.

10. A method of automatically providing replacement firmware to an electronic device to overwrite at least a portion of firmware stored in a rewritable, nonvolatile memory of the electronic device, comprising the steps of:
  (a) establishing communication with the electronic device;
  (b) receiving an indication from the electronic device that at least a portion of the firmware is in need of replacement;
  (c) accessing the replacement firmware; and
  (d) communicating the replacement firmware to the electronic device with an instruction causing the electronic device to overwrite the portion of the firmware in the rewritable, nonvolatile memory of the electronic device with the replacement firmware, wherein said portion of the firmware comprises machine instructions corresponding to a post-boot code.

11. The method of claim 10, wherein the communication with the electronic device is carried out over one of a universal serial bus, a serial bus, a parallel bus, a local area network, a wide area network, an IEEE 1394 connection, and a wireless communication channel.

12. The method of claim 10, wherein the step of establishing communication with the electronic device, comprises the steps of:
  (a) detecting the electronic device over one of a bus and a network;
  (b) determining an identifying characteristic of the electronic device; and
  (c) selecting and loading a driver program associated with the electronic device as a function of the identifying characteristic.

13. The method of claim 10, wherein the step of receiving an indication from the electronic device, comprises the steps of:
  (a) issuing a vendor specific request to the electronic device for a status of the firmware stored in the electronic device; and
  (b) receiving a vendor specific packet indicating that at least a portion of the firmware is in need of replacement.

14. The method of claim 10, further comprising the step of enabling a user to selectively replace the firmware in need of replacement with the replacement firmware.

15. A memory medium having machine instructions stored thereon for carrying out the steps of claim 10.

16. A system for automatically providing replacement firmware to an electronic device to overwrite at least a portion of firmware stored in a rewritable, nonvolatile memory of the electronic device, comprising:
  (a) a communication interface adapted to couple to an electronic device;
  (b) a processor; and
  (c) a memory in communication with the processor and storing machine instructions that cause the processor to carry out a plurality of functions including:
    (i) establishing communication with the electronic device through the communication interface;
    (ii) receiving an indication from the electronic device that at least a portion of the firmware is in need of replacement;
    (iii) accessing the replacement firmware; and
    (iv) communicating the replacement firmware through the communication interface to an electronic device with an instruction causing an electronic device to overwrite the portion of the firmware in need of replacement with the replacement firmware, wherein said portion of the firmware comprises machine instructions corresponding to a post-boot code.

17. The system of claim 16, wherein the communication with the electronic device is carried out over one of a universal serial bus, a serial bus, a parallel bus, a local area network, a wide area network, an IEEE 1394 connection, and a wireless communication channel.

* * * * *